United States Patent [19]

Chapman et al.

[11] Patent Number: 5,036,333
[45] Date of Patent: Jul. 30, 1991

[54] ANTENNA-ROTATION COMPENSATION APPARATUS AND METHOD FOR PHASED ARRAY ANTENNAS

[75] Inventors: C. Weldon Chapman, Garden Grove; Thomas W. Miller, Yorba Linda, both of Calif.

[73] Assignee: Hughes Aircraft Company, Los Angeles, Calif.

[21] Appl. No.: 541,683

[22] Filed: Jun. 21, 1990

[51] Int. Cl.$^5$ .............................................. G01S 1/78
[52] U.S. Cl. ................................. 342/370; 342/174; 342/194; 342/81
[58] Field of Search ................ 342/92, 93, 77, 371, 342/372, 195, 174, 173, 194, 187, 359, 370, 160, 161, 184, 81

[56] References Cited

U.S. PATENT DOCUMENTS

| | | | |
|---|---|---|---|
| 4,484,194 | 11/1984 | Arvidsson | 342/174 |
| 4,626,856 | 12/1986 | Pierson et al. | 342/174 |
| 4,804,963 | 2/1989 | Clapham | 342/195 |
| 4,868,574 | 9/1989 | Raab | 342/81 |
| 4,947,176 | 8/1990 | Inatsune et al. | 342/173 |

Primary Examiner—Thomas H. Tarcza
Assistant Examiner—Tod Swann
Attorney, Agent, or Firm—Wanda K. Denson-Low

[57] ABSTRACT

Electronic antenna-rotation compensation apparatus is provided for correcting data errors introduced into radar return signals by the rotation of phased array antennas. The apparatus includes circuitry for sampling and A-to-D converting I (in phase) and Q (quadrature) radar return signal components provided by individual antenna elements comprising the array antenna and for providing and applying correction factors to each ith signal components sample from each nth element across the antenna. The correction factors may be precomputed and stored in a memory for use when required or may be computed as needed. The corrected, digital I and Q signal component samples are supplied to a conventional processor, for example, as adaptive array processor, for extracting useful target data from return signal interference and clutter. A corresponding method is provided for compensating for the effects of phased array antenna rotation.

25 Claims, 5 Drawing Sheets

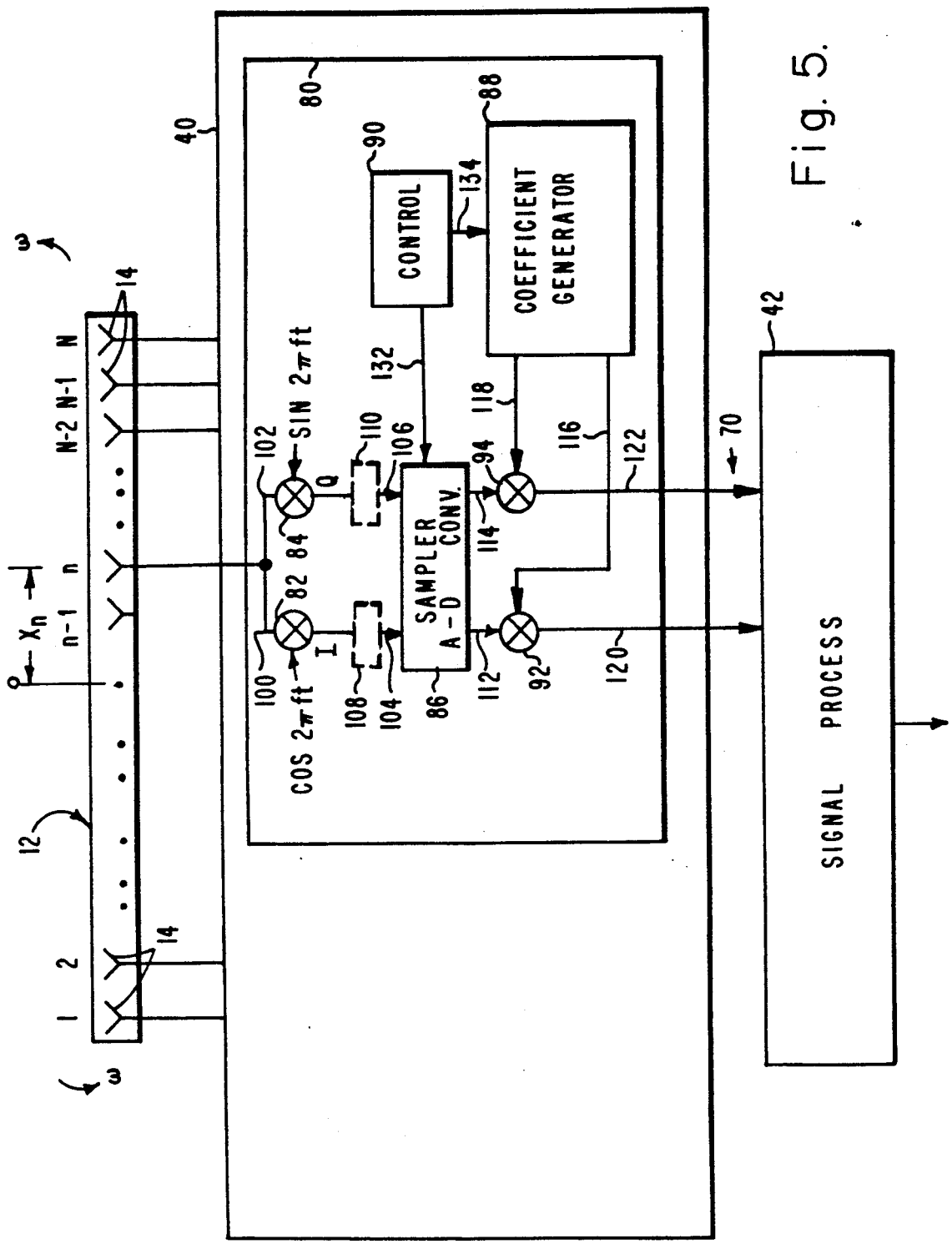

ANTENNA-ROTATION COMPENSATION APPARATUS AND METHOD FOR PHASED ARRAY ANTENNAS

BACKGROUND OF THE INVENTION

The present invention relates to rotating phased-array antennas, and more particularly to a method and apparatus for compensating for the effects of the antenna's rotation.

In radar systems with rotating phased-array antennas, there are two basic effects of the rotations which reduce an adaptive radar processor's sensitivity and its ability to suppress interference. The first effect is that all radiation sources appear to be extended because successive time samples from the same source originate at different angles relative to the antenna normal. The second effect is that the rotation imparts a doppler spread to radar returns since samples received at one edge of the rotating antenna exhibit a positive doppler shift, and samples received at the opposite edge experience a negative doppler shift, intermediate samples being uniformly spread in between these extremes. Neither effect should be neglected in an adaptive radar processing system, and failure to compensate for the effects leads to significant degradation to the performance of an adaptive processor in the presence of interference.

It would therefore represent an advance in the art to provide a means to compensate for the effects of the rotation on a rotating phased-array antenna.

SUMMARY OF THE INVENTION

Electronic apparatus, according to the present invention, is provided for compensating for the rotation of a rotatably-mounted, phased array radar antenna which has a number, N, of radiating and receiving elements arranged across the antenna in a direction orthogonal to the axis of antenna rotation and which is configured so that each of the elements provides separate in phase (I) and quadrature (Q) radar return signal components from radar signal reflections received thereby. The rotation compensating apparatus comprises means for sampling the I and Q return signal components provided by each of the elements in blocks of K sequential samples, each block having a pre-established time length, and for digitizing each of the samples. Included are means for providing a predetermined, specific phase angle correction factor, $\Delta_n(i)$, for each ith one of each of the K samples of the I and Q signal components from each nth one of the N elements, wherein $i = 1,2,3, \ldots, K$ and $n = 1,2,3, \ldots, N$. The correction factors, $\Delta_n(i)$, are determined according to the functional relationship:

$$\Delta_n(i) = F(w, T, x_n, f, c),$$

wherein:
is the angular rotational velocity of the antenna,
T is the time period associated with each ith sample,
$x_n$ is the distance from the axis of antenna rotation to the nth one of the elements,
f is the mid band operating frequency of the radar, and
c is the velocity of light.

Further included in the apparatus of the present invention are means for multiplying the I and Q return signal components provided by each of the N elements for each K samples by the corresponding one of the correction factors, $\Delta_n(i)$, so as to provide corrected I and Q return signal component samples; and means for processing the corrected I and Q return signal component samples in a manner providing radar target information for display or other purposes.

In accordance with a preferred embodiment of the invention, the correction factors, $\Delta_n(i)$, are obtained from the relationship:

$$\Delta_n(i) = i(2\pi f/c)x_n wT.$$

The means for providing the phase angle correction factors, $\Delta_n(i)$, may comprise memory means in which precomputed values of the factors are stored for each particular combination of w, T, f, and $x_n$ and for each value of i and for each of the antenna elements. Alternatively, the means for providing the phase angle correction factors may comprise a computer programmed for computing the factors for each particular combination of w, T, f and $x_n$ and for each value of i and for each of the antenna elements.

Preferably, the radar antenna is configured having N columns of antenna elements, an N by M array of elements being thereby provided. In such case, the same correction factor, $\Delta_n(i)$, is applied to each of the M elements in any nth column.

A corresponding method is provided for compensating for the rotation of a rotatably-mounted, phased array radar antenna having a number, N, of radiating and receiving elements arranged across the antenna in a direction orthogonal to the axis of antenna rotation and which is configured so that each of the elements provides separate in phase (I) and quadrature (Q) radar signal components from radar signal reflections received thereby. The rotation compensating method comprises the steps of sampling the I and Q return signal components provided by each of the elements in blocks of K sequential samples, each of the blocks having a pre-established time length, digitizing each of the samples, providing a predetermined, specific phase angle correction factor, $\Delta_n(i)$, for each ith one of each of the K samples of the I and Q signal components from each nth one of said N elements according to the above-cited equations and multiplying the I and Q return signal components provided by each of the N elements for each K samples by the corresponding one of the correction factors to provide corrected I and Q return signal component samples. The method also includes processing the corrected I and Q return signal component samples in a manner providing radar target information for display or other purposes.

The method step of providing the phase angle correction factors may comprise pre-computing the values for each particular combination of w, T, F and $x_n$ and for each value of i and for each antenna elements and storing the precomputed values in a memory means until required, or may comprise computing such factor for each particular combination of w, T, f and $x_n$ and for each value of i and for each antenna element as the factors are required.

BRIEF DESCRIPTION OF THE DRAWINGS

A better understanding of the present invention may be had from the following detailed description when taken in conjunction with the accompanying drawings, in which:

FIG. 5 is a functional block diagram showing a representative antenna rotation correction circuit associated with the array antenna.

DESCRIPTION OF THE PREFERRED EMBODIMENT

Figure 1:
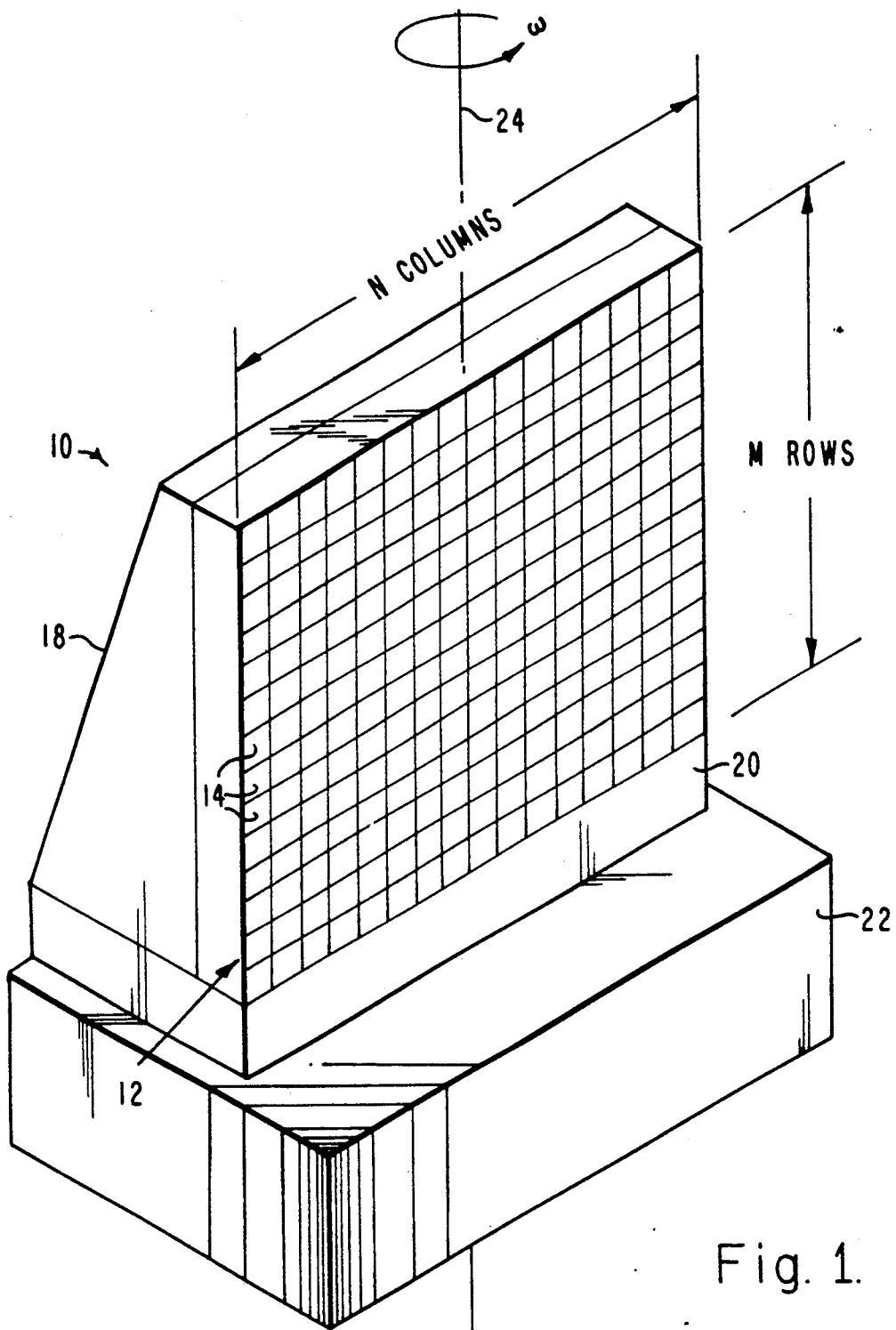
FIG. 1 is a perspective drawing of an exemplary phased array radar, which may be of the adaptive processor type, with which the rotation correcting apparatus of the present invention may be used to advantage and showing a rotatably mounted, phased array antenna.

Depicted in FIG. 1 is a representative or exemplary phased array radar 10, shown to be of the adaptive processor type, with which the antenna rotation compensation apparatus of the present invention may be used to advantage. Included in radar 10 is a phased array antenna 12 which comprises M rows and N columns of individual, microwave radiating and receiving antenna elements 14. Antenna elements 14 may, for example, comprise rectangular waveguide sections or aperture slots, both of which are well known in the radar art, as is the general construction and configuration of phased array radar antennas.

Regions rearwardly adjacent to antenna 12 may be enclosed by a housing 18, within which some of the radar electronics may be installed. Antenna 12 and housing 18 are shown mounted on a base 20 which is, in turn, rotatably mounted to a pedestal 22, thereby enabling the antenna to be rotated in azimuth about a vertical axis 24 at a predetermined angular velocity, w.

Figure 2:
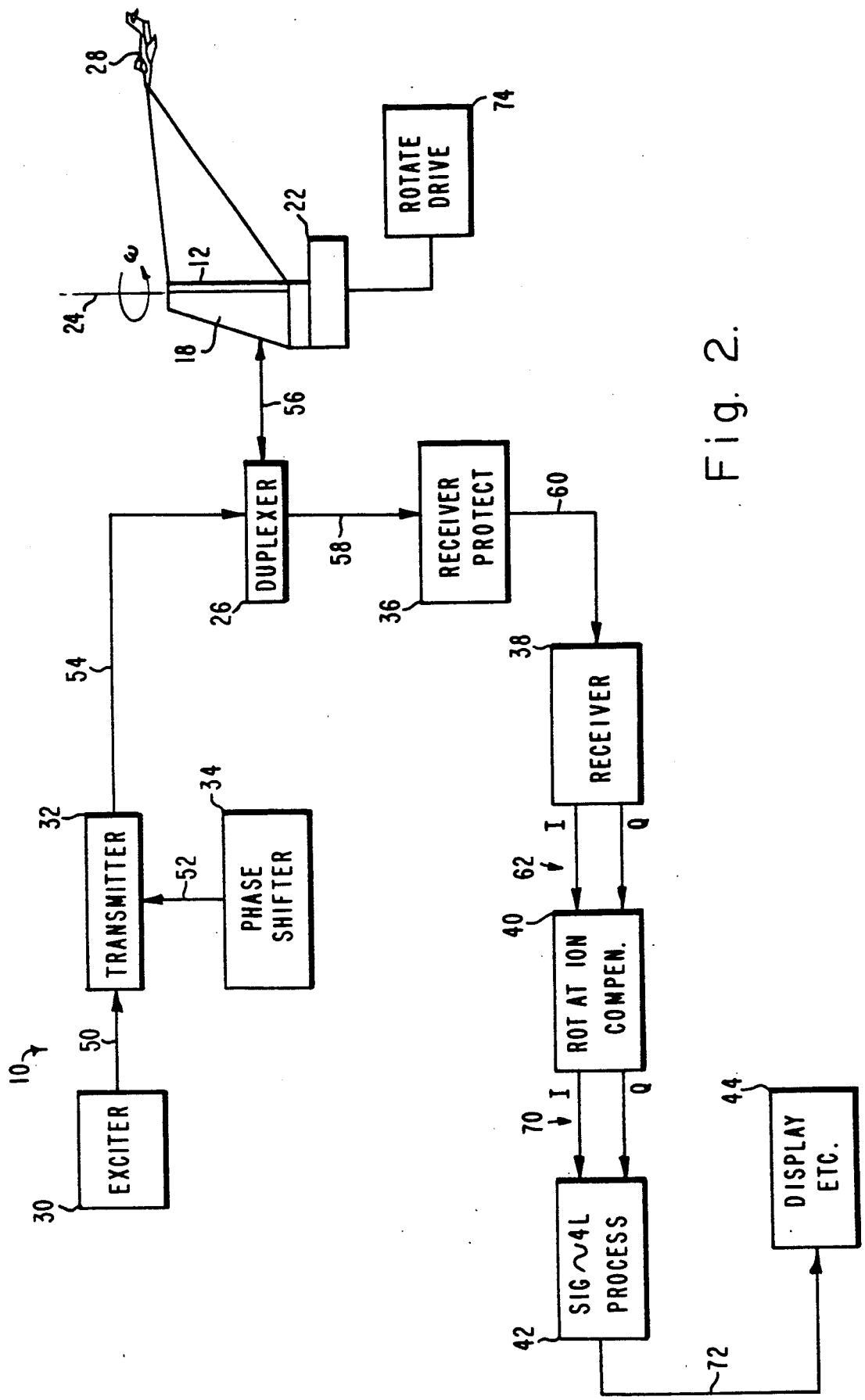
FIG. 2 is a functional block diagram showing major portions of the exemplary phased array radar of FIG. 1.

Further comprising radar 10, as more particularly described below and as shown in FIG. 2, are a duplexer 26 which enables antenna 12 to function both for transmitting radar signals and for receiving reflections of such signals from a target 28 or other objects. Also included in radar 10 are an exciter 30, a transmitter 32, a phase shifter 34, a receiver protection circuit 36, a receiver 38, a rotation compensation apparatus 40 of the present invention, an adaptive signal processor 42 and a display 44. Exciter 30 and phase shifter 32 are, as shown, respectively connected in a conventional manner, by conduits 50 and 52, to transmitter 32. In turn, transmitter 32 is connected to duplexer 26 by a conduit 54. Duplexer 26 is connected to antenna 12 by a conduit 56, and by a conduit 58 to receiver protection circuit 36, which is, in turn, connected to receiver 38 by a conduit 60. Receiver 38 is connected by a conduit 62 to rotation compensation apparatus 40. Signal processor 42 is connected to rotation compensation apparatus 40 by a conduit 70 and to display 44 by a conduit 72. Conduits 52-62 and 70 are typically multi-lead conduits to enable the parallel conduction of signals. An antenna rotation drive 74 is connected to antenna 12 for causing rotation of the antenna at the pre-established rotational velocity, w.

With the exception of rotation compensation apparatus 40 (described below), all the above-mentioned portions of radar 10 are of conventional configuration and are well known to those skilled in the radar art, being shown in order to place the present invention in proper context. As a consequence, these radar portions are further described herein only to the extent necessary for an understanding of rotation compensation apparatus 40.

Figure 3:
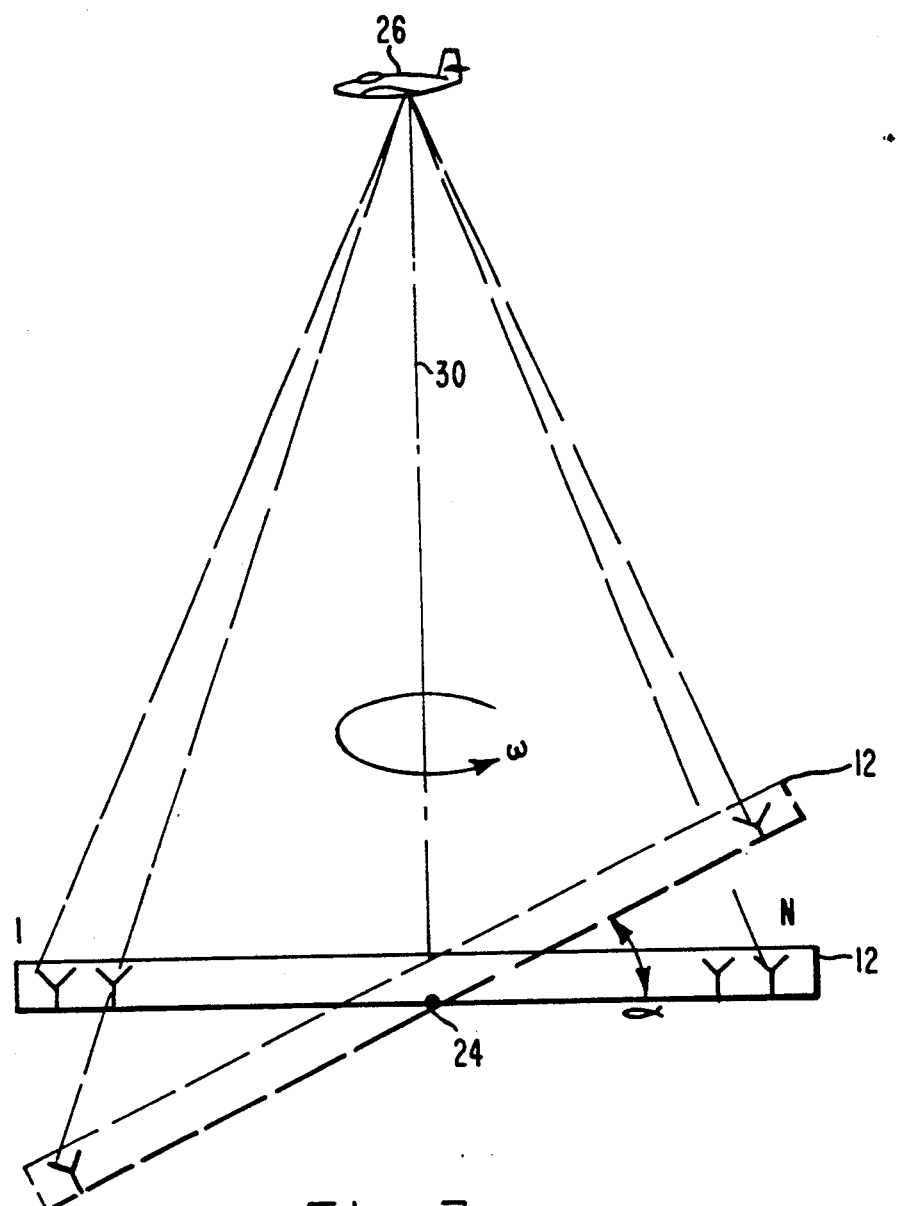
FIG. 3 is a diagram depicting the rotation of an array antenna while a target is being tracked.

Also to better enable an understanding of the present invention, FIG. 3 pictorially shows, obviously not to scale, a typical situation in which antenna 12 is tracking target 28 by conventional phase shifting techniques while, at the same time, the antenna is rotated about axis 24 to sweep the antenna through 360 degrees of azimuth. Typically, during the finite (although very short) time interval that the radar main lobe beam remains on target 28, antenna 12 is rotated through some small angle, $\alpha$. For counterclockwise rotation of antenna 12, while the radar beam remains on target 28, those antenna elements 14 (that is, those columns of elements) on the right-hand side of antenna rotational axis 24 are rotated generally toward the target. In contrast, those antenna elements 14 (columns of elements) on the left-hand side of rotational axis 24 are rotated generally away from the target. As can be seen, the far right-hand (Nth) antenna element (that is, the Nth column of elements) is rotated the greatest distance toward the target and the far left-hand (1st) antenna element (that is, the first column of elements) is rotated the greatest distance away from the target.

As above discussed in the BACKGROUND OF THE INVENTION, the adverse effects of the described rotational movement of an array antenna (corresponding to antenna 12) relative to a target are: (i) that the radiation sources appear to be extended because successive samples from the same source (that is, the same element 14 or column of elements 14) originate at different angles relative to an antenna normal 30, and (ii) the antenna rotation imparts a doppler spread to radar returns, with return signal samples received at one side edge of the antenna exhibiting a positive doppler shift and corresponding samples received at the opposite side edge of the antenna exhibiting a negative doppler shift (signal samples received by intermediate columns of elements being generally spread between these extremes).

These two effects of antenna rotation cause the in phase (I) and quadrature (Q) components of the return signals received by each antenna element 14 to be phase shifted from what they otherwise would be in the absence of antenna rotation. As a result, adaptive processing of the uncorrected I and Q return signal components from all of antenna elements 14 typically provides erroneous or incomplete target information, especially in the presence of return signal interference (for example, electronic jamming signals) or background clutter.

The present invention substantially corrects, or compensates for, these effects of antenna rotation by appropriately weighting successive return signal samples provided by each antenna element 14. As a result, adaptive signal processor degradation due to rotation of antenna 12 is substantially eliminated and the sensitivity of processor 42 at least closely approaches that of any corresponding adaptive processor associated with a nonrotating, phased array antenna. As more particularly described below, rotation compensation apparatus 40 of the present invention accomplishes this result by applying predetermined phase angle corrections to the I and Q return signal components provided by each antenna element 14. These predetermined phase angle correction factors are based, in part, on antenna element location relative to rotational axis 24 and the angular velocity, w, of antenna 12.

For purposes of describing the present invention, the output of each array element 14 is considered to first be down-converted, in a known, conventional manner, to baseband, maintaining the I and Q components. These analog I and Q components are next filtered and sampled, in blocks of a K number of samples, the first sample in each block serving as a reference. This sampling is performed every T seconds, the number, K, of samples depending upon the sampling period, T, and upon the angular rotational velocity, w, of antenna 12. The sampled analog I and Q signal components are then digitized in an A/D converter. Within rotation compensation apparatus 40, the digitized I and Q return signal components from each antenna element 14 are multiplied by fixed correction factors, the corresponding complex output from each ith sample (of the K samples) of each nth antenna element 14 being phase shifted by an amount, $\Delta_n(i)$, according to the general expression:

$$\Delta_n(i) = iF(w, T, x_n, f, c),  \quad (1)$$

wherein: w and T are as above defined, $x_n$ is the distance of the nth antenna element 14 (or nth column of elements) from antenna rotational axis 24, f is the center output signal frequency (mid-band frequency) of radar 10, and c is the velocity of light.

The numerical values of these correction factors, $\Delta_n(i)$, can be either pre-computed and the values stored in a memory (such as ROM) for access as required during radar operation, or computed (for example, by a microprocessor or computer) as required during operation of radar 10. The digitized I and Q component samples, after being multiplied by the appropriate $\Delta_n(i)$ factors, are then further processed in adaptive processor 42, in a known, conventional manner for target detection purposes.

Figure 4:
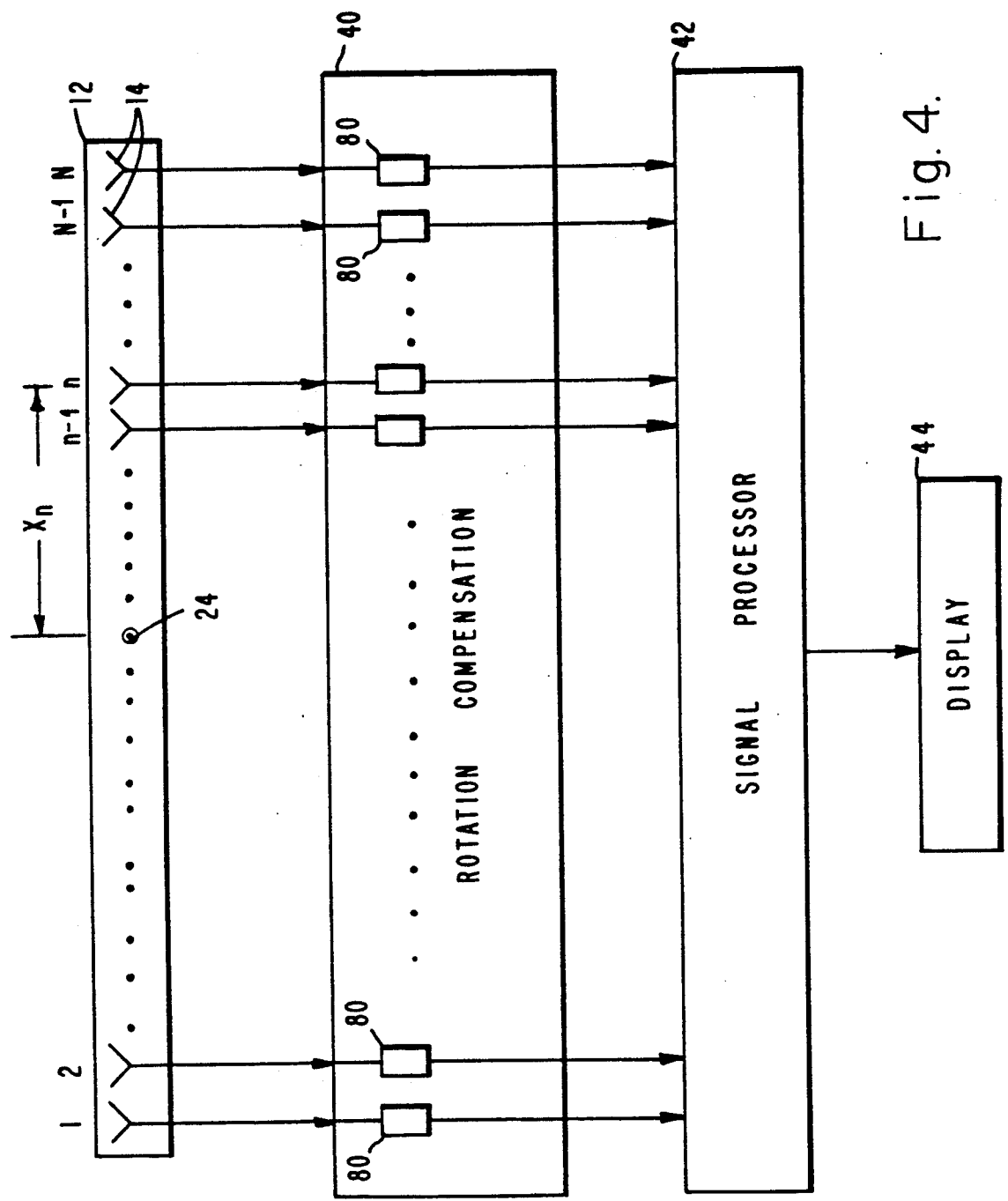
FIG. 4 is an expanded functional block diagram showing portions of the radar in which correction factors are applied to I and Q return signal components to compensate for antenna rotation.

More specifically, the correction factors $\Delta_n(i)$, given in general form by Equation 1, are computed according to the following expression:

$$\Delta_n(i) = i(2\pi f/c)x_n wT,  \quad (2)$$

and are, for each nth antenna element 14 and for each ith one of the samples in each block of K samples, provided by rotation compensation means 40 (FIGS. 2, 4 and 5). Comprising such means 40 are a number of individual rotational correcting circuits 80 (FIG. 4) arranged in parallel. The output of each antenna element 14 is fed (after passing through duplexer 26, receiver protection circuit 36 and receiver 38) into a corresponding one of correction circuits 80.

Comprising each of correction circuits 80, a representative one of which is depicted in functional block diagram form in FIG. 5, are respective I and Q analog mixer (multiplier) circuits 82 and 84, a sample and A/D converter circuit 86, a $\Delta_n(i)$ coefficient generator circuit 88, a control circuit 90 and respective I and Q digital mixer (multiplier) circuits 92 and 94. Received radar return signals from a corresponding antenna element 14 are fed in parallel, over respective conduits 100 and 102, into mixer circuits 82 and 84. $\cos 2\pi$ ft and $\sin 2\pi$ ft signals are also respectively fed into mixer circuits 82 and 84 so that the mixer circuits provide, over respective output conduits 104 and 106, analog I and Q signal components to sample and A/D converter circuit 86. Signal filters 108 and 110 (shown in phantom lines) may be provided in respective conduits 104 and 106.

Within sample and A/D converter circuit 86, the analog I and Q signal components are sampled at a rate or frequency equal to 1/T in blocks of K samples. Each time a block of K samples has been taken of the I and Q signal components, the sampling sequence is repeated. The time length of each sampling block is equal to KT, which is selected to be equal to a required or pre-established radar beam dwell time on target. Also within sample and A/D converter circuit 86, the sampled I and Q signals for each sampling block are converted into digital signals for further processing as described below. Alternatively, the analog I and Q signals fed into sample and A/D converter circuit 86 may first be analog-to-digital converted and the digital signals then sampled at the 1/T sampling rate. Whichever sequence of sampling and digitizing is followed, the digitized I and Q component samples are output from sample and A/D converter circuit 86, over respective conduits 112 and 114, to respective mixers 92 and 94.

Coefficient generating circuit 88 provides the K $\Delta_n(i)$ rotation correction coefficients for each sampling block in accordance with Equation 2 above. These $\Delta_n(i)$ coefficients are, as hereinabove described, derived from pre-established radar parameters and can, therefore, be computed in advance and stored in coefficient generating circuit 88 and accessed as needed during radar operation. In such case, coefficient generating circuit 88 may comprise or principally comprise a memory unit, such as a ROM (read only memory). Alternatively, the K set of $\Delta_n(i)$ coefficients may be computed in coefficient generating circuit 88 for each ith sample of each block of K samples as the coefficients are required. In such case, coefficient generating circuit 88 may comprises a microcomputer, a microprocessor or portions of a mainframe computer (not shown) associated with radar 10. In either configuration, coefficient generating circuit 88 provides the $\Delta_n(i)$ coefficients every sample period, T, over respective conduits 116 and 118 to respective mixers 91 and 94.

Within respective mixers 92 and 94, the digitized I and Q samples from sample and A/D converter circuit 86 are multiplied by the corresponding $\Delta_n(i)$ coefficients to provide corrected I and Q return signal components, in sampled and digitized format, over respective conduits 120 and 122 (which form conduit 70 shown in FIG. 2) to signal processor 42 for further processing in a conventional manner.

Control circuit 90, which also forms a part of correcting circuit 80, is connected by respective conduits 132 and 134 to sample and A/D converter circuit 86 and coefficient generating circuit 88 to provide control signals thereto. As such, control circuit 88 coordinates the providing of appropriate ones of the $\Delta_n(i)$ coefficients at the appropriate time to mixers 92 and 94 so that corresponding ith signal samples and ith coefficients, $\Delta_n(i)$ are multiplied together in the mixers. It is considered by the present inventors that control circuit 80 and coefficient generating circuit are sufficiently described above to enable those of ordinary skill in the electronic and radar arts to provide such circuits with little or no experimentation.

It can be appreciated that each correcting circuit 80 for all antenna elements 14 in any particular nth column of elements will be exactly the same in that the identical correction factors, $\Delta_n(i)$, will be applied to all elements in the same column. Correcting circuits 80 used for the elements 14 in any particular column of antenna elements may be combined together to the extent that a common coefficient generating circuit 88 may be employed to generated common $\Delta_n(i)$ values. Ordinarily, however, these correction factors, $\Delta_n(i)$, must be separately applied to the I and Q signal components provided by each element 14 in the column, since it is not expected that I and Q components would be identical for all elements in the column. Moreover, it can be appreciated that correcting circuits 80 vary from element column to column only to the extent that different sets of correction factors, $\Delta_n(i)$, are stored in or generated by the associated ones of the coefficient generating circuit 88.

By way of specific example to further illustrate the present invention, and with no limitations thereby intended or implied, the sample block length, KT, may be about 10 milliseconds. The number of samples, K, may be $10^4$ and the sampling period, T, may accordingly be $10^6$ seconds. It may be assumed that the mid-band frequency, f, of radar 10 is 3.2 gigahertz. The angular velocity, w, of antenna may be $\pi$ radians per second (that is, 180 degrees per second), and the velocity of light, c, is a constant known to be approximately $2.998 \times 10^8$ meters per second. By way of further example, it may be considered that antenna 12 is two (2) meters across, the maximum $x_n$ for the Nth element (or column of elements) and thus also for the first (n=1) being one (1) meter. Substituting these values into Equation 2, it is seen that $\Delta_N(i)$ is equal to about 0.0121 degrees, which is the phase angle correction to be applied to the Nth element (or to the Nth column of elements).

It is apparent that from the foregoing description that a corresponding method can be provided for correcting radar return signals received by a rotating, phased array antenna which also functions as a transmitting antenna. In brief, the corresponding method includes sampling and digitizing the I and Q return signal components received by each of antenna elements 14 and multiplying each ith signal sample of each nth antenna element by a correcting factor, $\Delta_n(i)$, obtained in accordance with Equation 2. The corrected I and Q signal component samples are then processed in a conventional manner to provide target information.

Although there has been described above a particular arrangement of an antenna rotation correction apparatus, and a corresponding method, according to the present invention for purposes of illustrating the manner in which the invention may be used to advantage, it is to be understood that the invention is not limited thereto. Accordingly, any and all variations or modifications which may occur to those skilled in the art are to be considered to be within the scope and spirit of the invention as defined in the appended claims.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. Electronic apparatus for compensating for the rotation of a rotatably-mounted, phased array radar antenna which has a number, N, of radiating and receiving elements arranged across the antenna in a direction transverse to the axis of antenna rotation and which is configured so that each of the elements provides separate radar return signal components from radar signal reflections received thereby, the rotation compensating apparatus comprising:

means for sampling the return signal components provided by each of the elements in blocks of K sequential samples, each of said blocks having a pre-established time length, and for digitizing each of said samples;

means for providing a predetermined, specific phase angle correction factor, $\Delta_n(i)$, for each ith one of each of the K samples of the signal components from each nth one of said N elements, wherein $i=1,2,3,\ldots,K$ and $n=1,2,3\ldots,N$, each said correction factor being dependent on the distance of the corresponding element from the axis of antenna rotation; and means for multiplying the return signal components provided by each of the N elements for each K samples by the corresponding one of the correction factors, $\Delta_n(i)$, so as to provide corrected return signal component samples.

2. The antenna rotation compensation apparatus as claimed in claim 1 wherein the correction factors, $\Delta_n(i)$, are obtained from the relationship:

$$\Delta_n(i) = i(2\pi f/c)x_n wT$$

wherein: w is the angular rotational velocity of antenna, T is the time period associated with each ith sample, $x_n$ is the distance from the axis of antenna rotation to the nth one of the elements, f is the mid band operating frequency of the radar, and c is the velocity of light.

3. The antenna rotation compensation apparatus as claimed in claim 1 wherein the number K is equal to about $1 \times 10^4$ and wherein T is equal to about 1 usec.

4. The antenna rotation compensation apparatus as claimed in claim 2 wherein w is equal to about $\pi$ radians per second and wherein f is equal to about $3.1 \times 10^9$ Hz.

5. The antenna rotation compensation apparatus as claimed in claim 1 wherein the means for providing the phase angle correction factors, $\Delta_n(i)$, comprises memory means in which precomputed values of $\Delta_n(i)$ are stored for each particular combination of $x_n$ and for each value of i and for each of said antenna elements.

6. The antenna rotation compensation apparatus as claimed in claim 1 wherein the means for providing the phase angle correction factors, $\Delta_n(i)$, comprises a computer programmed for computing the factors for each particular combination of $x_n$ and for each value of i and for each of said antenna elements.

7. The antenna rotation compensation apparatus as claimed in claim 1 wherein the radar antenna is configured having N columns of antenna elements, each of said N columns comprising M elements, an N by M array of elements being thereby provided, and wherein the same correction factor, $\Delta_n(i)$, is applied to each of the M elements in any nth column.

8. Electronic apparatus for compensating for the rotation of a rotatably-mounted, phased array radar antenna which has a number, N, of radiating and receiving elements arranged across the antenna in a direction transverse to the axis of antenna rotation and which is configured so that each of the elements provides in phase (i) and quadrature (Q) radar return signal components from radar signal reflections received thereby, the rotation compensating apparatus comprising:

means for sampling the return signal components provided by each of the elements in blocks of K sequential samples, each of said blocks having a pre-established time length, and for digitizing each of said samples;

means for providing a predetermined, specific phase angle correction factor, $\Delta_n(i)$, for each ith one of each of the K samples of the I and Q signal components from each nth one of said N elements, wherein $i=1,2,3,\ldots,K$ and $n=1,2,3\ldots,N$, according to the functional relationship:

$$\Delta_n(i) = F(w, T, x_n, f, c),$$

each said correction factor being dependent on the distance of the corresponding element from the axis of antenna rotation wherein: w is the angular rotational velocity of antenna, T is the time period associated with each ith sample, $x_n$ is the distance from the axis of antenna rotation to the nth one of the elements, f is the mid band operating frequency of the radar, and c is the velocity of light;

means for multiplying the return signal components provided by each of the N elements for each K samples by the corresponding one of the correction factors, $\Delta_n(i)$, so as to provide corrected return signal component samples; and means for processing said corrected return signal component samples in a manner providing radar target information for display or other purposes 9. The antenna rotation compensation apparatus as claimed in claim 8 wherein the correction factors, $\Delta_n(i)$, are obtained from the relationship:

$$\Delta_n(i) = i(2\pi f/c) x_n wT.$$

10. The antenna rotation compensation apparatus as claimed in claim 9 wherein the number K is equal to about $1 \times 10^4$ and wherein T is equal to about 1 usec.

11. The antenna rotation compensation apparatus as claimed in claim 9 wherein w is equal to about $\pi$ radians per second and wherein f is equal to about $3.1 \times 10^9$ Hz.

12. Electronic apparatus for compensating for the rotation of a rotatably-mounted antenna for an adaptive, phased array radar, the antenna having a number, N, of radiating and receiving elements arranged thereacross in a direction orthogonal to the axis of antenna rotation and being configured so that each of the elements provides separate in phase (I) and quadrature (Q) radar return signal components from radar signal reflections received thereby, the rotation compensating apparatus comprising:

means for sampling the I and Q return signal components provided by each of the elements in blocks of K sequential samples, each of said block having a pre-established time length, and for digitizing each of said samples;

means for providing a predetermined, specific phase angle correction factor, $\Delta_n(i)$, for each ith one of each of the K samples of the I and Q signal components from each nth one of said N elements, wherein $i=1,2,3,\ldots,K$ and $n=1,2,3,\ldots,N$, according to the functional relationship:

$$\Delta_n(i) = i(2\pi f/c) x_n wT.$$

wherein: w is the angular rotational velocity of the antenna, T is the time period associated with each ith sample, $x_n$ is the distance from the axis of antenna rotation to the nth one of the elements, f is the mid band operating frequency of the radar, and c is the velocity of light; and means for multiplying the I and Q return signal components samples provided by each of the N elements for each K samples by the corresponding one of the correction factors, $\Delta_n(i)$, so as to provide corrected I and Q return signal component samples.

13. The antenna rotation compensation apparatus as claimed in claim 12 wherein K is equal to about $1 \times 10^4$, w is equal to about $\pi$ radians per second, T is equal to about $1 \times 10^{-6}$ seconds and f is equal to about $3.2 \times 10^9$ Hz.

14. The antenna rotation compensation apparatus as claimed in claim 12 wherein the means for providing the phase angle correction factors, $\Delta_n(i)$, comprises memory means in which precomputed values of $\Delta_n(i)$ are stored for each particular combination of w, T, f and $x_n$ and for each value of i and for each of said antenna elements.

15. The antenna rotation compensation apparatus as claimed in claim 12 wherein the means for providing the phase angle correction factors, $\Delta_n(i)$, comprises a computer programmed for computing the factors for each particular combination of w, T, f and $x_n$ and for each value of i and for each of said antenna elements.

16. The antenna rotation compensation apparatus as claimed in claim 12 wherein the radar antenna is configured having N columns of antenna elements, each of said N columns comprising M elements, an N by M array of elements being thereby provided, and wherein the same correction factor, $\Delta_n(i)$, is applied to each of the M elements in any nth column.

17. A method for compensating for the rotation of a rotatably-mounted, phased array radar antenna which has a number, N, of radiating and receiving elements arranged across the antenna in a direction orthogonal to the axis of antenna rotation and which is configured so that each of the elements provides separate in phase (I) and quadrature (Q) radar return signal components from radar signal reflections received thereby, the rotation compensating method comprising the steps of:

sampling the I and Q return signal components provided by each of the elements in blocks of K sequential samples, each of said blocks having a pre-established time length, and digitizing each of said samples;

providing a predetermined, specific phase angle correction factor, $\Delta_n(i)$, for each ith one of each of the K samples of the I and Q signal components from each nth one of said N elements, wherein $i=1,2,3,\ldots,K$ and $n=1,2,3,\ldots,N$, according to the functional relationship:

$$\Delta_n(i) = (F(w, T, x_n, f, c),$$

wherein: w is the angular rotational velocity of the antenna, T is the time period associated with each ith sample, $x_n$ is the distance from the axis of antenna rotation to the nth one of the elements, f is the mid band operating frequency of the radar, and c is the velocity of light; and multiplying the I and Q return signal components provided by each of the N elements for each K sample by the corresponding one of the correction factors, $\Delta_n(i)$, so as to provide corrected I and Q return signal component samples.

18. The antenna rotation compensation method as claimed in claim 17 including obtaining the correction factors, $\Delta_n(i)$, from the relationship:

$$\Delta_n(i) = i(2\pi f/c)x_n wT.$$

19. The antenna rotation compensation method as claimed in claim 18 wherein the number K is equal to about $1 \times 10^4$ and wherein T is equal to about 1 usec.

20. The antenna rotation compensation method as claimed in claim 18 wherein w is equal to about $\pi$ radians per second and wherein f is equal to about $3.1 \times 10^9$ Hz.

21. A method for compensating for the rotation of a rotatably-mounted, phased array radar antenna which has a number, N, of radiating and receiving elements arranged across the antenna in a direction orthogonal to the axis of antenna rotation and which is configured so that each of the elements provides separate in phase (I) and quadrature (Q) radar return signal components from radar signal reflections received thereby, the rotation compensating method comprising the steps of:

sampling the I and Q return signal components provided by each of the elements in blocks of K sequential samples, each of said blocks having a pre-established time length, and digitizing each of said samples;

providing a predetermined, specific phase angle correction factor, $\Delta_n(i)$, for each ith one of each of the K samples of the I and Q signal components from each nth one of said N elements, wherein $i=1,2,3,\ldots,K$ and $n=1,2,3,\ldots,N$, according to the functional relationship:

$$\Delta_n(i) = i(2\pi f/c)x_n wT,$$

wherein: w is the angular rotational velocity of the antenna, T is the time period associated with each ith sample, $x_n$ is the distance from the axis of antenna rotation to the nth one of the elements, f is the mid band operating frequency of the radar, and c is the velocity of light; and multiplying the I and Q return signal components provided by each of the N elements for each K sample by the corresponding one of the correction factors, $\Delta_n(i)$, so as to provide corrected I and Q return signal component samples.

22. The antenna rotation compensation apparatus as claimed in claim 21 wherein K is equal to about $1 \times 10^4$, w is equal to about $\pi$ radians per second, T is equal to about $1 \times 10^{-6}$ seconds and f is equal to about $3.2 \times 10^9$ Hz.

23. The antenna rotation compensation apparatus as claimed in claim 22 wherein the step of providing the phase angle correction factors, $\Delta_n(i)$, comprises pre-computing the $\Delta_n(i)$ values for each particular combination of w, T, f and $x_n$ and for each value of i and for each of said antenna elements and storing said precomputed values in a memory means until required.

24. The antenna rotation compensation apparatus as claimed in claim 23 wherein the step of providing the phase angle correction factors, $\Delta_n(i)$, comprises computing the factors for each particular combination of w, T, f and $x_n$ and for each value of i and for each of said antenna elements as the factors are required.

25. The antenna rotation compensation apparatus as claimed in claim 22 wherein the radar antenna is configured having N columns of antenna elements, each of said N columns comprising M elements, an N by M array of elements being thereby provided, and including the step of applying the same correction factor, $\Delta_n(i)$, to each of the M elements in any nth column.

* * * * *